(12) United States Patent
Ostino et al.

(10) Patent No.: US 12,091,989 B2
(45) Date of Patent: Sep. 17, 2024

(54) TURBOMACHINE BLADE WITH IMPROVED COOLING

(71) Applicants: SAFRAN, Paris (FR); SAFRAN AIRCRAFT ENGINES, Paris (FR)

(72) Inventors: Léandre Ostino, Moissy-Cramayel (FR); Pierre Guillaume Auzillon, Moissy-Cramayel (FR); Michel Slusarz, Moissy-Cramayel (FR); Patrice Eneau, Moissy-Cramayel (FR); Thomas Olivier Michel Pierre De Rocquigny, Moissy-Cramayel (FR); Romain Pierre Cariou, Moissy-Cramayel (FR); Ba-Phuc Tang, Moissy-Cramayel (FR); Adrien Bernard Vincent Rollinger, Moissy-Cramayel (FR); Vianney Simon, Moissy-Cramayel (FR)

(73) Assignees: SAFRAN, Paris (FR); SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/595,008

(22) PCT Filed: Apr. 24, 2020

(86) PCT No.: PCT/EP2020/061502
§ 371 (c)(1),
(2) Date: Nov. 5, 2021

(87) PCT Pub. No.: WO2020/224995
PCT Pub. Date: Nov. 12, 2020

(65) Prior Publication Data
US 2022/0205365 A1 Jun. 30, 2022

(30) Foreign Application Priority Data
May 9, 2019 (FR) ...................................... 1904817

(51) Int. Cl.
*F01D 5/18* (2006.01)
*B22C 9/10* (2006.01)

(52) U.S. Cl.
CPC .............. *F01D 5/187* (2013.01); *B22C 9/106* (2013.01); *F05D 2220/30* (2013.01);
(Continued)

(58) Field of Classification Search
CPC .... F01D 5/186; F01D 5/187; F05D 2250/185; F05D 2260/20; F05D 2260/202; B22C 9/10; B22C 9/106
(Continued)

(56) References Cited

U.S. PATENT DOCUMENTS

| | | | |
|---|---|---|---|
| 7,513,739 B2 * | 4/2009 | Boury | F01D 5/187 415/115 |
| 7,967,566 B2 * | 6/2011 | Liang | F01D 5/187 416/97 R |

(Continued)

FOREIGN PATENT DOCUMENTS

| | | |
|---|---|---|
| CN | 107708891 A | 2/2018 |
| FR | 3021697 A1 | 12/2015 |

(Continued)

OTHER PUBLICATIONS

Search Report issued in French Patent Application No. 1904817 dated Jan. 14, 2020.

(Continued)

*Primary Examiner* — Christopher Verdier
*Assistant Examiner* — Arthur Paul Golik
(74) *Attorney, Agent, or Firm* — Pearne & Gordon LLP

(57) ABSTRACT

A turbine vane includes a root carrying a blade terminated by a squealer tip, the blade having intrados and extrados walls, a leading edge, a trailing edge, and a tip wall delimiting a bottom of the squealer tip, by which the intrados wall is (Continued)

connected to the extrados wall. The blade also includes: a serpentine median circuit, including a first radial pipe that collects air at the root and is connected by a first bend to a second radial pipe that is connected by a second bend to a third radial pipe; a cavity under the squealer tip running along the extrados wall and extending from a central region of the squealer tip to the trailing edge; and a central radial pipe collecting air at the root and extending between at least two of the three pipes of the median circuit and directly supplying the cavity under the squealer tip.

26 Claims, 4 Drawing Sheets

(52) U.S. Cl.
    CPC .... *F05D 2250/185* (2013.01); *F05D 2260/20* (2013.01); *F05D 2260/202* (2013.01)
(58) Field of Classification Search
    USPC ......................................................... 164/369
    See application file for complete search history.

(56) References Cited

U.S. PATENT DOCUMENTS

| | | | | |
|---|---|---|---|---|
| 8,562,295 | B1 * | 10/2013 | Liang | F01D 5/189 |
| | | | | 29/889.7 |
| 8,870,524 | B1 * | 10/2014 | Liang | F01D 9/065 |
| | | | | 415/115 |
| 2007/0122282 | A1 * | 5/2007 | Deschamps | F01D 5/187 |
| | | | | 416/97 R |

FOREIGN PATENT DOCUMENTS

| | | | |
|---|---|---|---|
| FR | 3056631 A1 | 3/2018 | |
| FR | 3057906 A1 * | 4/2018 | ............. F01D 5/186 |
| FR | 3067388 A1 | 12/2018 | |
| FR | 3072415 A1 | 4/2019 | |

OTHER PUBLICATIONS

International Search Report for issued in Application No. PCT/FR2020/061502 dated Jun. 25, 2020.
Written Opinion for PCT/FR2020/061502 dated Jun. 25, 2020.
First Office Action for corresponding Chinese application No. 202080034426.2 dated Apr. 13, 2023.

* cited by examiner

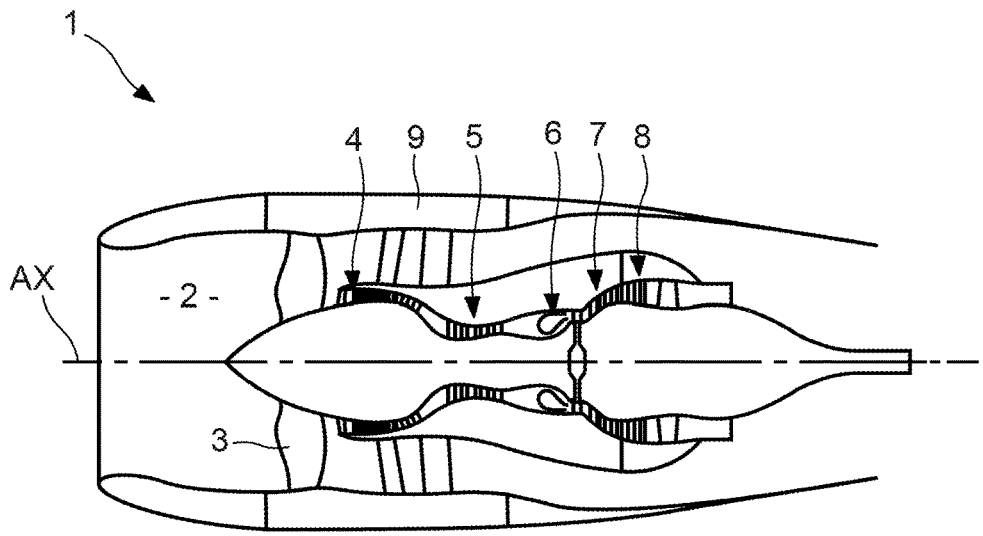
FIG. 1
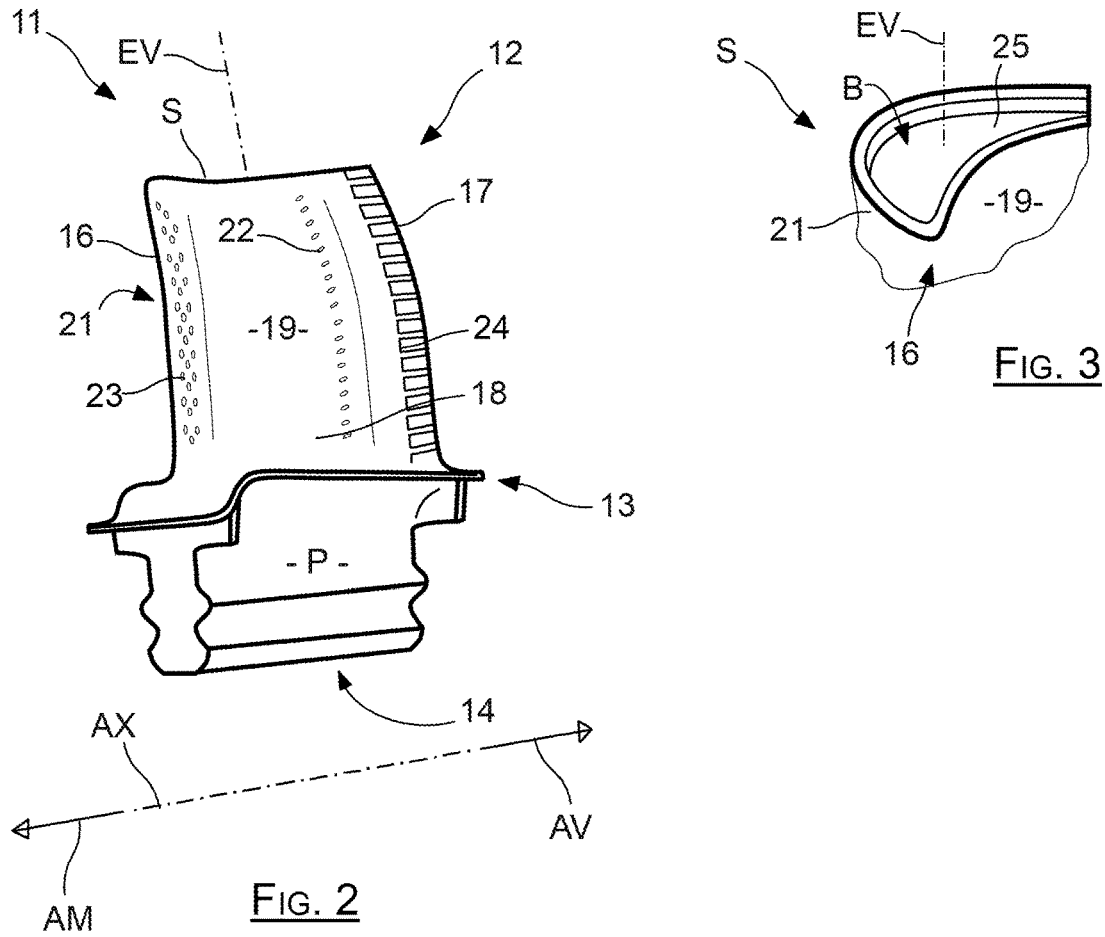
FIG. 2
FIG. 3

TURBOMACHINE BLADE WITH IMPROVED COOLING

This is the National Stage of PCT international application PCT/EP2020/061502, filed on Apr. 24, 2020, which claims the priority of French Patent Application No. 1904817 filed May 9, 2019, both of which are incorporated herein by reference in their entirety.

TECHNICAL FIELD

The invention relates to a blade for an aircraft engine of the turbomachine type, such as for example a turbojet or a turboprop, and it applies in particular to a high pressure type turbine blade.

PRIOR ART

In such a turbojet-type engine, marked with 1 in FIG. 1, the air is taken into an inlet sleeve 2 to pass through a fan including a series of rotating vanes 3 before splitting into a central primary flow and a secondary flow surrounding the primary flow.

The primary flow is compressed by low pressure 4 and high pressure 5 compressors before reaching a combustion chamber 6, after which it expands through a high pressure turbine 7 and a low pressure turbine 8, before being discharged while generating an auxiliary thrust. The secondary flow is propelled directly by the fan to generate a main thrust.

Each turbine 7, 8 includes series of blades which are radially oriented and regularly spaced around an axis of rotation AX, an outer casing 9 surrounding the entire engine.

The cooling of the turbine blades is ensured by circulating in each blade air drawn upstream of the combustion chamber and taken at the blade root, this air being discharged through drillings and/or slots passing through the walls of these blades.

In general, the efficiency of the cooling, and in particular the reduction in the flow rate necessary for cooling the blades of high pressure turbines, allows to reduce the fuel consumption of a turbojet, and to increase the service life of the blades. In this regard, various blade arrangements have been proposed, as in particular in patent document FR3021697.

Nevertheless, it appears that the cooling of high pressure turbine blades requires a constant improvement effort, in particular due to the continual evolution of operating conditions, manufacturing methods and performance requirements.

In this context, the purpose of the invention is to provide a new blade design having an improved cooling circuit.

DESCRIPTION OF THE INVENTION

To this end, the object of invention is a turbine blade of a turbomachine such as a turbojet, intended to be mounted around an axis of rotation on a rotor disc rotating around an axis of rotation, comprising a root for mounting it in a cell of the disc, and a hollow vane extending from the root in a radial spanwise direction ending in a tip forming a squealer, the vane comprising a lower surface wall and an upper surface wall, as well as a leading edge, a trailing edge and a tip wall delimiting a bottom of the squealer, and by which the lower surface wall is connected to the upper surface wall, this vane also comprising:

- a middle circuit of the trombone type, including a first duct collecting air at the root and which is connected by a first elbow to a second duct which is connected by a second elbow to a third duct, these first second and third ducts being mainly radial, the second and third radial ducts being located between the first duct and the trailing edge;
- a cavity under the squealer located on the side of the upper surface wall and the tip wall and which extends along the tip to the trailing edge;
- a mainly radial central duct located between the upper surface wall and the second duct of the middle circuit, this central duct collecting air at the root and extending between at least two of the three ducts of the middle circuit to directly supply the cavity under the squealer.

Thanks to the supply of the cavity under the squealer via a central duct located between the ducts of the coil-type circuit, the air conveyed to the cavity under the squealer is not heated, which allows to effectively cool the lower surface wall close to the tip and to the trailing edge.

The invention also relates to a blade thus defined, wherein one end of the third duct and at least part of the first elbow are located between the cavity under the squealer and the lower surface wall.

The object of the invention is also a blade thus defined, wherein at least part of the first elbow is located between the cavity under the squealer and the lower surface wall, and wherein the third duct has an end which ends at the tip wall.

The invention also relates to a blade thus defined, wherein the central duct and the cavity under the squealer form an L-shaped duct located on the side of the upper surface wall.

The object of the invention is also a blade thus defined, wherein the central duct extends between at least two ducts of the middle circuit which both extend over the majority of their respective lengths from the upper surface wall to the lower surface wall.

The object of the invention is also a blade thus defined, wherein the first duct and the third duct both extend over the majority of their lengths from the lower surface wall to the upper surface wall, and wherein the central duct extends on the one hand between the first duct and the third duct, and on the other hand between the second duct and the upper surface wall.

The object of the invention is also a blade thus defined, wherein the lower surface wall includes cooling holes which pass therethrough and open into the third duct to form a film for cooling the lower surface wall upstream of the trailing edge.

The object of the invention is also a blade thus defined, wherein the lower surface wall is devoid of holes opening into the first duct and/or into the second duct.

The object of the invention is also a blade thus defined, including cooling slots passing through the lower surface wall along the trailing edge in order to cool it, and wherein at least one of these slots is located on the side of the tip and is supplied with cooling air by the cavity under the squealer.

The object of the invention is also a blade thus defined, comprising an additional downstream circuit including a mainly radial downstream duct, this downstream duct collecting air at the root to supply several slots for cooling the trailing edge.

The object of the invention is also a blade thus defined, wherein the downstream duct supplies the slots via a downstream ramp with which it communicates by mainly axial channels.

The object of the invention is also a blade thus defined, comprising at least one mainly radial upstream duct dedicated to cooling the leading edge, this radial upstream duct collecting cooling air at the root to cool the leading edge by discharging this air through holes passing through the wall of the vane at the leading edge.

The object of the invention is also a turbomachine turbine comprising a blade thus defined.

The object of the invention is also a turbine thus defined.

The object of the invention is also a ceramic core for the manufacture of a turbine blade of a turbomachine such as a turbojet, intended to be mounted around an axis of rotation on a rotor disc rotating around an axis of rotation, comprising a root for mounting it in a cell of the disc, and a hollow vane extending from the root in a radial spanwise direction ending in a tip forming a squealer, the vane comprising a lower surface wall and an upper surface wall, as well as a leading edge, a trailing edge and a tip wall delimiting a bottom of the squealer, and by which the lower surface wall is connected to the upper surface wall, this core comprising:

a core element to form a middle circuit of the trombone type, including a first duct collecting air at the root and which is connected by a first elbow to a second duct which is connected by a second elbow to a third duct, these first, second and third ducts being mainly radial, the second and third ducts being located between the first duct and the trailing edge;

another core element to form a cavity under the squealer located on the side of the upper surface wall and the tip wall and which extends from a central region of the tip to the trailing edge, as well as a mainly radial central duct located between the upper surface wall and the middle duct, this central duct collecting air at the root and extending between at least two of the three ducts of the middle circuit to directly supply the cavity under the squealer.

BRIEF DESCRIPTION OF THE DRAWINGS

FIG. 1 is a sectional view of a known turbojet;

FIG. 2 is an external perspective view of a blade according to the invention;

FIG. 3 is a perspective view of the tip of the blade according to the invention;

DETAILED DESCRIPTION OF THE INVENTION

Figure 4:
FIG. 4 is a view of the cooling circuit upstream of the blade according to the invention shown alone and seen from the side of the lower surface.

The idea at the basis of the invention is to design a blade wherein the air flow necessary for cooling its middle part is reduced to promote better cooling of its critical parts, such as in particular the lower surface wall in the region of the tip near the trailing edge.

General Arrangement of the Blade

The blade according to the invention, marked by 11 in FIG. 2, comprises a root P by which it is fixed to a cell of a rotor disc called a turbine disc, and a vane 12 carried by this root P, with a platform 13 connecting the root P to the vane 12. This blade 11 which is hollow includes four internal circuits wherein circulates cooling air taken by four openings located on a radially internal face 14 of the root P.

The vane 12 has a shape twisted around an axis called spanwise axis EV substantially perpendicular to an axis AX of rotation of the rotor carrying the blade, this axis of rotation being a longitudinal axis of the engine. It comprises a leading edge 16 substantially parallel to the spanwise direction EV and located upstream AM or before the blade, relative to the general direction of gas flow in the turbomachine. It includes a trailing edge 17 substantially parallel to the leading edge 16 and spaced therefrom along the axis AX to be downstream AV or behind the blade. It also comprises a tip S substantially parallel to the base 18 and spaced therefrom in the spanwise direction EV.

The two main walls of this blade are its lower surface wall 19, visible in FIG. 2, and its upper surface wall 21, which are spaced from one another while being united at the leading edge 16, at the trailing edge 17, and in the region of the tip S. The lower surface wall includes cooling holes 22 which pass therethrough and are supplied by an internal cooling circuit to form a film on the external face of the lower surface 19 in order to protect it thermally in the region located upstream of the trailing edge 17.

The leading edge 16 is domed and includes cooling holes 23 passing through its wall, and the trailing edge 17 which is tapered includes a series of cooling slots. These slots 24 are of short lengths and extend parallel to the spanwise direction EV, being spaced apart and in the extension of each other in the spanwise direction EV, that is to say the radial direction, and they are located at a short distance from the trailing edge strictly speaking. Each slot 24 passes through the lower surface wall to blow air on the outer face of this lower surface wall towards the trailing edge which is provided with external ribs channelling this air parallel to the axis AX.

As shown in FIG. 3, the tip S includes a tip wall 25 oriented perpendicularly to the spanwise direction EV, which connects the lower surface and upper surface wall. This tip wall 25 is set back towards the axis AX relative to the free edges of the lower surface and upper surface walls, to form therewith a hollow portion, called a squealer and identified by B, which is open in the direction opposite to the axis AX.

This blade is a one-piece part from the foundry of a metallic material, which is obtained by using a set of cores to delimit its internal cooling ducts, these cores being removed after casting and cooling, for example with a chemical etching process. FIGS. 4 to 10 show internal regions of the blade which are represented therein by the shapes of the cores allowing to manufacture this blade. The shapes of these FIGS. 4 to 10 are thus in relief, but they also constitute representations of the hollow shapes of the blade.

The blade 11 according to the invention includes four internal cooling circuits: an upstream circuit 26; a central circuit 27; a middle circuit 28 extending on either side of the central circuit; and a downstream circuit 29.

The manufacture of this blade by foundry is ensured by using ceramic cores comprising four core elements which can be rigidly secured together, each core element delimiting one of the circuits 26, 27, 28 and 29.

Upstream Circuit

As shown in FIG. 4, the upstream circuit 26 includes a radial upstream duct 31, that is to say extending parallel to the spanwise direction EV. This duct extends from its mouthpiece 32 located at the root P of the vane, to a region of the tip S located under the squealer: it ends with the tip wall delimiting the bottom of the squealer of the blade.

The air collected in the mouthpiece 32 travels through the duct 31 to supply the cooling holes 23 allowing effective cooling of the wall portion constituting the leading edge 16 of the blade.

Central Circuit

Figure 6:
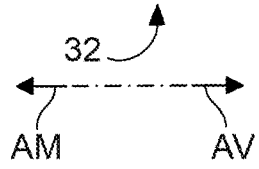
FIG. 6 is a view of the central cooling system of the blade according to the invention shown alone and seen from the side of the lower surface.

The central circuit 27 which appears in FIG. 6 comprises a mainly radial central duct 34 extended by an axial cavity under the squealer 36, that is to say extending along the axis AX, this central duct 34 being dedicated to the supply of air to this cavity under the squealer 36 and to the cooling of the region of the tip S close to the trailing edge. The central duct 34 extends from the root P of the blade where it includes a mouthpiece 37 through which it collects the cooling air, and it ends with the tip wall 25.

The cavity under the squealer 36 extends longitudinally, from a central region of the tip S, to the trailing edge 17, and the upstream end of this cavity 36 is connected to the radial end of the central duct 34 to be supplied with air therethrough. The length of the cavity under the squealer 36 is comprised between 10 and 50% of the axial chord of the aerodynamic profile of the blade, that is to say the length of the vane in the axial direction. A short length allows to supply the slot(s) 24 of the trailing edge with fresh air which is not heated in contact with the lower surface and upper surface walls. A great length ensures enhanced cooling of the lower surface wall at the tip of the blade.

This cavity under the squealer 36 is delimited laterally on the one hand by the upper surface wall 21 over most of the length of this cavity, and on the other hand by the lower surface wall 19 in the vicinity of the trailing edge 17 and in the front part by an internal curved wall of the blade separating the middle circuit from the central circuit. In other words, over most of its length, the cavity under the squealer 36 is in contact with the upper surface, and it is in contact with the upper surface and the lower surface in the downstream region of the blade, that is to say near the trailing edge of this vane. This cavity under the squealer 36 is delimited along the spanwise axis EV, by the tip wall 25, and by a bottom parallel to this tip wall and spaced therefrom.

The central duct 34 is in turn delimited laterally by the lower surface wall 19, and by the wall separating the central circuit 27 from the middle circuit 28. The air circulating in this central duct 34 is thus in contact with the lower surface wall 19, but not with the upper surface wall 21.

The cavity under the squealer 36 thus extends mainly at the tip of the blade of the central part to the region close to the trailing edge 17 in order to ensure maximum cooling by heat exchange in this region which is subjected to a high gas temperature and is critical to oxidation and scaling. This cavity 36 allows in particular to supply fresh air to one or more of the slots 24 for cooling the trailing edge on the lower surface side which are closest to the tip S, while effectively ventilating the lower surface wall 19 close to the tip S and to the trailing edge 17 through its internal face.

Coil-Type Middle Circuit

Figure 5:
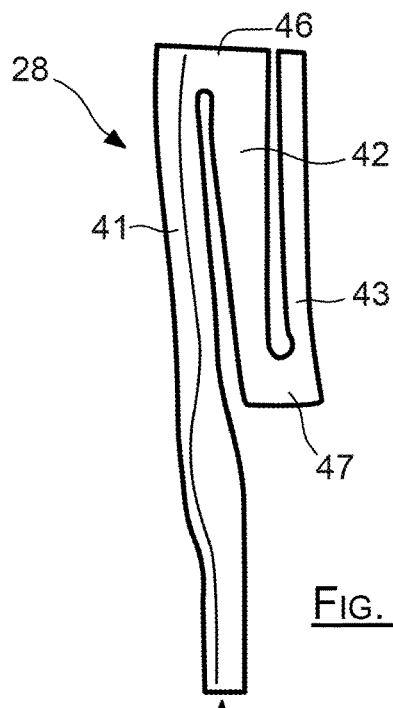
FIG. 5 is a view of the middle cooling circuit of the blade according to the invention, shown alone and seen from the side of the lower surface.

The middle circuit 28 which is visible in FIG. 5 includes three radial ducts 41, 42 and 43 communicating with each other in a coil arrangement, also called a trombone, to maximise the path of the air in order to use the air from this duct at full capacity. The first and the third duct 41 and 43 are located respectively upstream and downstream of the central duct 34 of the circuit 27, while the second duct 42 is at the same level as the central duct 34 along the axis AX while being interposed between this central duct 34 and the lower surface wall.

The ducts 41, 42, 43 constituting the middle circuit 28 are thus located around the central duct 34, to limit the heating of the air conveyed by this central duct 34 to the cavity under the squealer 36 so as to effectively cool the region of the tip of the blade near the trailing edge.

First Duct:

The first duct 41 is thus located longitudinally between the upstream duct 31 of the upstream circuit 26 and the central duct 34 of the central circuit 27, running alongside them both. This first duct 41 collects air at the root P by its mouthpiece 44 and it is ended at the tip wall by being connected to the second duct 42 by a first elbow 46. This first duct 41 extends laterally from the upper surface wall 21 to the lower surface wall 19, so that the air flowing therein is in direct contact with the lower surface and upper surface walls.

This first duct 41 has no drillings passing through the lower surface wall 19 and no drillings passing through the upper surface wall 21: it does not generate a cooling film on the outer face of the blade. This allows to promote a high flow rate in this first duct. As the air circulates in this first duct from the root P to the tip S, it is pressed against the lower surface wall by the Coriolis effect, but the extent of the contact surface with the lower surface wall is reduced: this combination allowing to increase heat exchange with the lower surface wall to cool it as much as possible.

Second Duct:

The second duct 42 of the middle circuit 28 runs alongside the first duct 41 and the central duct 34 of the central circuit 27, extending laterally between the lower surface wall 19 and the internal wall which separates it from the central duct 34, this central duct extending laterally from this internal wall to the upper surface wall 21. This second duct 42 thus has a thickness in the lateral direction which is of the order of half that of the first duct 41, and the air circulating therein is in contact with the lower surface wall 19 but is not in contact with the upper surface wall 21.

Optionally, this second duct 42 is itself also devoid of holes passing through the lower surface wall 19: in this case, it does not contribute to cooling by external film, in order to promote a high flow rate also in this second duct 42. As the air circulates in this second duct 42 from the tip S to the root P, it is pressed by the Coriolis effect against the internal wall which is subjected to a gas temperature less than the lower surface wall, so that the heating of air in this second duct 42 is relatively low.

Internal Wall:

The internal wall of the blade, not shown in the figures, extends between the second duct 42 of the middle circuit 28, and the central duct 34 of the central circuit 27, is a curved central wall extending on the one hand from the base 18 to the region of the tip S, and on the other hand from the lower surface 19 to the upper surface 21. In operation, this internal wall has a relatively low temperature because it is not in contact with the fluid in which is immersed the blade. Moreover, this internal wall takes up a significant portion of the centrifugal forces undergone by the blade in service, which limits damage to this blade by creep.

Third Duct:

The second duct 42 is connected in the region of the base 18 of the blade to the third duct 43, by a second elbow 47 located laterally between the lower surface wall and the internal wall.

The third duct 43 is spaced from the second duct 42 along the axis AX, and it runs alongside said second duct, extending from the base 18 to the region under the squealer, parallel to the central duct 34 which also runs alongside it. Over most of its length, this third duct 43 extends laterally from the lower surface wall 19 to the upper surface wall 21. But at its terminal end, the section of this third duct 43 is reduced so that it extends laterally from the cavity under the squealer 36 to the lower surface wall 19, and it ends with the tip wall 25.

The air circulating in this third duct 43 is thus in direct contact with the lower surface and upper surface walls over most of its length, but it is in contact only with the lower surface in the end portion of this duct due to the fact that this end extends from the cavity under the squealer 36 to the lower surface wall 19.

The mouthpiece 44 constitutes the only air supply path for the entire middle circuit, this air passing successively through the ducts 41, 42 and 43. When it passes through the first and the second duct 41 and 42, this air retains a high flow rate thanks to the absence of drillings in the first duct and optionally in the second duct, and it is slightly heated therein. When the air reaches the third duct 43 thus it has a high flow rate and a relatively low temperature allowing to effectively cool this part. This part is cooled in particular by means of cooling holes 22 passing through the lower surface wall 19 to form a film of air thermally protecting the outer face of the lower surface wall 19 upstream of the trailing edge 17.

In general, thanks to the combination of the central circuit 27 and the middle circuit 28 according to the invention, the air flow to cool the area in the middle of the vane is less than the flow rate required with a conventional cooling circuit.

Arrangement of the Middle Circuit Relative to the Cavity Under the Squealer

Figure 9:
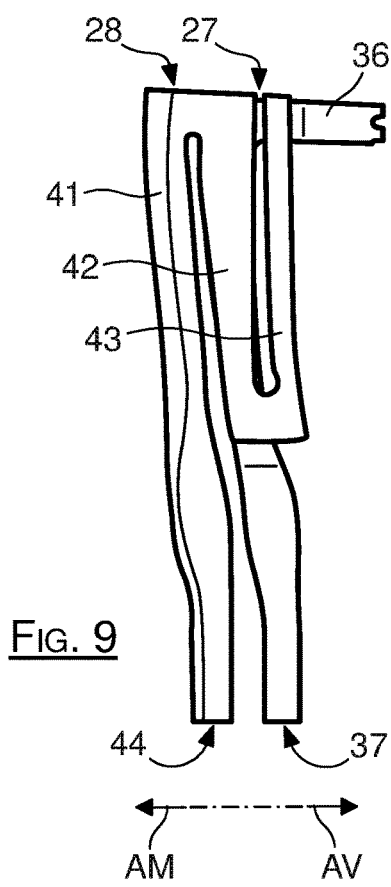
FIG. 9 is an overview showing the middle circuit and the central cooling circuit as arranged in the blade according to the invention and seen from the side of the lower surface.
Figure 10:
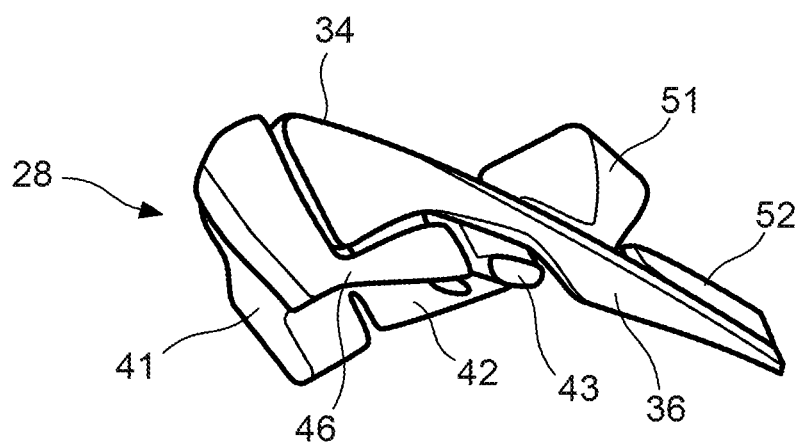
FIG. 10 shows the cavity under the squealer as well as the middle, central and downstream circuits seen in the spanwise direction at a distance from the longitudinal axis.

As seen more clearly in FIGS. 9 and 10, the cavity under the squealer 36 extends from the side of the upper surface, relative to the tip of the third duct 43 and to the first elbow 46 which both run alongside the lower surface. This cavity under the squealer 36 cools the lower surface wall 19 at the tip of the blade near the trailing edge.

The cavity under the squealer is isolated from the lower surface wall which is hot, over most of its length thanks to the first duct 41 and the first elbow 46 both located between the cavity under the squealer 36 and the lower surface 19 which is the hottest wall. Thus, the air arriving at the downstream end of the cavity under the squealer is sufficiently cold to effectively cool the lower surface close to the trailing edge.

In this context, and as visible more clearly in FIG. 10, the section of the third duct 43 is narrowed at its tip, so as to free up space for the cavity under the squealer 36.

In a variant, the terminal end of the third duct 43 is located under the cavity under the squealer 36 so as to extend upstream the length of the cavity under the squealer in contact with the lower surface wall, to further improve the cooling of the tip of the blade: the low flow rate of relatively heated air arriving at the tip of the third duct 43 is not used to cool the tip of the blade on the lower surface side close to the trailing edge. This variant, which may be conditioned by the manufacturing constraints of the core elements and by the casting constraints, does not correspond to the representation of the end of the third duct as it appears in FIGS. 5 and 8 to 10.

Downstream Circuit

Figure 7:
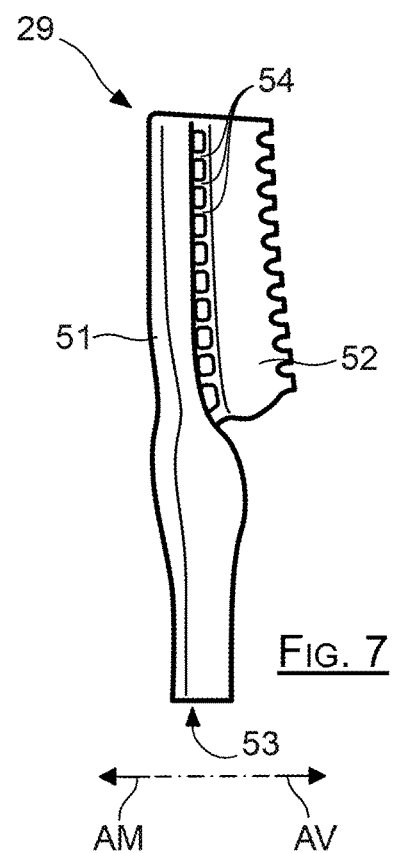
FIG. 7 is a view of the downstream cooling circuit of the blade according to the invention shown alone and seen from the side of the lower surface.
Figure 8:
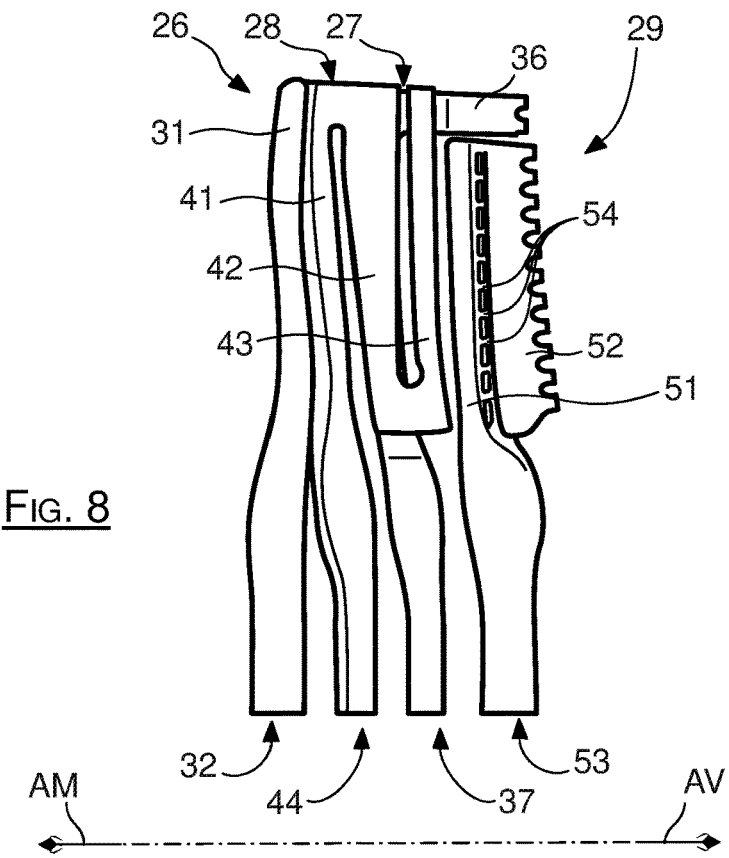
FIG. 8 is an overview of the four cooling circuits as arranged in the blade according to the invention and seen from the side of the lower surface.

As can be seen in FIG. 7, the downstream circuit 29 includes a downstream duct 51 supplying a downstream ramp 52 which runs alongside this downstream duct 51 and which in turn supplies the cooling slots 24.

More particularly, the downstream ramp 52 is at a distance from the duct 51 along the axis AX, and it is connected to the latter by a series of mainly axial channels 54, that is to say extending along the axis AX. These channels 54 are regularly spaced radially relative to each other along the spanwise direction EV, and ensure a homogeneous supply of air to the downstream ramp 52 over its entire height, each channel having a calibrated passage section, that is to say predetermined passage section.

The duct 51 and the ramp 52 extend in the spanwise direction EV from a mouthpiece 53 located at the root P and through which the cooling air is collected, to the cavity under the squealer 36.

In general, the various circuits may include flow disruptors disposed in their ducts to generate turbulence in order to increase the heat exchanges between the air and the blade at said circuits.

Advantages

In general, the vane according to the invention allows to reduce the air flow rate necessary for its cooling, by significantly reducing the flow rate necessary for cooling the middle portion of the blade extending substantially halfway between its leading edge and its trailing edge, and preserving cold air to cool the lower surface close to the tip and to the trailing edge.

Thanks to the supply of the cavity under the squealer via a central duct located between the ducts of the coil-type circuit, the air conveyed to the cavity under the squealer is not heated, which allows to effectively cool the lower surface wall close to the tip and to the trailing edge.

The fact that the first and the second duct of the coil-type circuit are devoid of holes towards the upper surface and towards the lower surface allows to preserve a high flow rate in this coil-type circuit to effectively cool the external faces of the downstream part of the blade thanks to the third duct of this coil-type circuit.

With this arrangement, the upstream circuit includes a single duct dedicated to cooling the leading edge which is thereby also cooled to a maximum.

The invention claimed is:

1. A turbine blade of a turbomachine, intended to be mounted around an axis of rotation on a rotor disc rotating around the axis of rotation, comprising a root for mounting it in a cell of the disc, and a hollow vane extending from the root in a radial spanwise direction ending in a tip forming a squealer, the vane comprising a lower surface wall and an upper surface wall, as well as a leading edge, a trailing edge and a tip wall delimiting a bottom of the squealer, and by which the lower surface wall is connected to the upper surface wall, this vane also comprising:
   a trombone type middle circuit, including a first duct configured to collect air at the root and which is connected by a first elbow to a second duct which is connected by a second elbow to a third duct, these first, second and third ducts extending in the radial spanwise direction, the second and third ducts being located between the first duct and the trailing edge;

a cavity under the squealer located on a side of the upper surface wall and the tip wall and which extends along the tip to the trailing edge;

a central duct extending laterally between the upper surface wall and the second duct of the trombone type middle circuit, this central duct configured to collect air at the root and extending between at least two of the three ducts of the trombone type middle circuit to directly supply the cavity under the squealer, said central duct extending in the radial spanwise direction, and wherein at least part of the first elbow and one end of the third duct are located between the cavity under the squealer and the lower surface wall.

2. The blade according to claim 1, wherein the central duct and the cavity under the squealer form an L-shaped duct located on the side of the upper surface wall.

3. The blade according to claim 1, wherein the central duct extends between at least two ducts of the trombone type middle circuit which both extend over the majority of their respective longitudinal lengths from the upper surface wall to the lower surface wall.

4. The blade according to claim 3, wherein the first duct and the third duct both extend over the majority of their respective longitudinal lengths from the lower surface wall to the upper surface wall, and wherein the central duct extends between the first duct and the third duct, and between the second duct and the upper surface wall.

5. The blade according to claim 1, wherein the lower surface wall includes cooling holes configured to form a film of cooling air for cooling the lower surface wall upstream of the trailing edge, said cooling holes pass through the lower surface wall and open into the third duct.

6. The blade according to claim 1, wherein the lower surface wall is devoid of holes opening into the first duct and/or into the second duct.

7. The blade according to claim 1, including cooling slots passing through the lower surface wall along the trailing edge in order to cool it, and wherein at least one of these slots is located adjacent the tip and is configured to be supplied with cooling air by the cavity under the squealer.

8. The blade according to claim 1, further comprising a downstream circuit including a downstream duct configured to collect air at the root to supply several slots for cooling the trailing edge, said downstream duct extending in the radial spanwise direction.

9. The blade according to claim 8, wherein the downstream duct is configured to supply the slots via a downstream ramp with which it communicates by channels extending in a direction of the axis of rotation.

10. The blade according to claim 1, comprising at least one upstream duct extending in the radial spanwise direction and dedicated to cooling the leading edge, this upstream duct configured to collect cooling air at the root to cool the leading edge by discharging this air through holes passing through the leading edge.

11. A turbomachine turbine comprising a blade according to claim 1.

12. The turbomachine comprising a turbine according to claim 11.

13. A turbine blade of a turbomachine, intended to be mounted around an axis of rotation on a rotor disc rotating around the axis of rotation, comprising a root for mounting it in a cell of the disc, and a hollow vane extending from the root in a radial spanwise direction ending in a tip forming a squealer, the vane comprising a lower surface wall and an upper surface wall, as well as a leading edge, a trailing edge and a tip wall delimiting a bottom of the squealer, and by which the lower surface wall is connected to the upper surface wall, this vane also comprising:

a trombone type middle circuit, including a first duct configured to collect air at the root and which is connected by a first elbow to a second duct which is connected by a second elbow to a third duct, these first, second and third ducts extending in the radial spanwise direction, the second and third ducts being located between the first duct and the trailing edge;

a cavity under the squealer located on a side of the upper surface wall and the tip wall and which extends along the tip to the trailing edge;

a central duct extending laterally between the upper surface wall and the second duct of the trombone type middle circuit, this central duct configured to collect air at the root and extending between at least two of the three ducts of the trombone type middle circuit to directly supply the cavity under the squealer, said central duct extending in the radial spanwise direction, and wherein at least part of the first elbow is located between the cavity under the squealer and the lower surface wall, and wherein the third duct has an end which ends at the tip wall.

14. The blade according to claim 13, wherein the central duct and the cavity under the squealer form an L-shaped duct located on the side of the upper surface wall.

15. The blade according to claim 13, wherein the central duct extends between at least two ducts of the trombone type middle circuit which both extend over the majority of their respective longitudinal lengths from the upper surface wall to the lower surface wall.

16. The blade according to claim 15, wherein the first duct and the third duct both extend over the majority of their respective longitudinal lengths from the lower surface wall to the upper surface wall, and wherein the central duct extends between the first duct and the third duct, and between the second duct and the upper surface wall.

17. The blade according to claim 13, wherein the lower surface wall includes cooling holes configured to form a film of cooling air for cooling the lower surface wall upstream of the trailing edge, said cooling holes pass through the lower surface wall and open into the third duct.

18. The blade according to claim 13, wherein the lower surface wall is devoid of holes opening into the first duct and/or into the second duct.

19. The blade according to claim 13, including cooling slots passing through the lower surface wall along the trailing edge in order to cool it, and wherein at least one of these slots is located adjacent the tip and is configured to be supplied with cooling air by the cavity under the squealer.

20. The blade according to claim 13, further comprising a downstream circuit including a downstream duct configured to collect air at the root to supply several slots for cooling the trailing edge, said downstream duct extending in the radial spanwise direction.

21. The blade according to claim 20, wherein the downstream duct is configured to supply the slots via a downstream ramp with which it communicates by channels extending in a direction of the axis of rotation.

22. The blade according to claim 13, comprising at least one upstream duct extending in the radial spanwise direction and dedicated to cooling the leading edge, this upstream duct configured to collect cooling air at the root to cool the leading edge by discharging this air through holes passing through the leading edge.

23. A turbomachine turbine comprising a blade according to claim 13.

24. The turbomachine comprising a turbine according to claim 23.

25. A ceramic core for the manufacture of a turbine blade of a turbomachine, intended to be mounted around an axis of rotation on a rotor disc rotating around the axis of rotation, said turbine blade comprising a root for mounting it in a cell of the disc, and a hollow vane extending from the root in a radial spanwise direction ending in a tip forming a squealer, the vane comprising a lower surface wall and an upper surface wall, as well as a leading edge, a trailing edge and a tip wall delimiting a bottom of the squealer, and by which the lower surface wall is connected to the upper surface wall, this core comprising:
   a core element to form a trombone type middle circuit, including a first duct configured to collect air at the root and which is connected by a first elbow to a second duct which is connected by a second elbow to a third duct these first second and third ducts extending in the radial spanwise direction, the second and third ducts being located between the first duct and the trailing edge;
   another core element to form a cavity under the squealer located on a side of the upper surface wall and the tip wall and which extends along the tip to the trailing edge, as well as a central duct extending laterally between the upper surface wall and the trombone type middle circuit, this central duct configured to collect air at the root and extend between at least two of the three ducts of the trombone type middle circuit and directly supply the cavity under the squealer, said central duct extending in the radial spanwise direction, and
   wherein at least part of the first elbow and one end of the third duct are located between the cavity under the squealer and the lower surface wall.

26. A ceramic core for the manufacture of a turbine blade of a turbomachine, intended to be mounted around an axis of rotation on a rotor disc rotating around the axis of rotation, said turbine blade comprising a root for mounting it in a cell of the disc, and a hollow vane extending from the root in a radial spanwise direction ending in a tip forming a squealer, the vane comprising a lower surface wall and an upper surface wall, as well as a leading edge, a trailing edge and a tip wall delimiting a bottom of the squealer, and by which the lower surface wall is connected to the upper surface wall, this core comprising:
   a core element to form a trombone type middle circuit, including a first duct configured to collect air at the root and which is connected by a first elbow to a second duct which is connected by a second elbow to a third duct these first second and third ducts extending in the radial spanwise direction, the second and third ducts being located between the first duct and the trailing edge;
   another core element to form a cavity under the squealer located on a side of the upper surface wall and the tip wall and which extends along the tip to the trailing edge, as well as a central duct extending laterally between the upper surface wall and the trombone type middle circuit, this central duct configured to collect air at the root and extend between at least two of the three ducts of the trombone type middle circuit and directly supply the cavity under the squealer, said central duct extending in the radial spanwise direction, and
   wherein at least part of the first elbow is located between the cavity under the squealer and the lower surface wall, and wherein the third duct has an end which ends at the tip wall.

\* \* \* \* \*